United States Patent
Araujo Dos Santos (10) Patent No.: US 10,325,375 B2
(45) Date of Patent: Jun. 18, 2019

(54) METHOD AND DEVICE FOR COUNTING OBJECTS IN IMAGE DATA IN FRAMES, A FRAME OF SAID IMAGE DATA IN FRAMES INCLUDING AT LEAST ONE OBJECT, SUCH AS CANS, BOTTLES, AND PACKAGING, COMPUTER PROGRAM AND COMPUTER PROGRAM PRODUCT

(71) Applicant: SICPA BRASIL INDÚSTRIA DE TINTAS E SISTEMAS LTDA., Rio de Janeiro, RJ (BR)

(72) Inventor: Leonardo Araujo Dos Santos, Roche (CZ)

(73) Assignee: SICPA BRASIL INDUSTRIA DE TINTAS E SISTEMAS LTDA., Rio de Janeiro, RJ (BR)

( * ) Notice: Subject to any disclaimer, the term of this patent is extended or adjusted under 35 U.S.C. 154(b) by 23 days.

(21) Appl. No.: 14/894,075

(22) PCT Filed: May 27, 2014

(86) PCT No.: PCT/IB2014/000875
§ 371 (c)(1),
(2) Date: Nov. 25, 2015

(87) PCT Pub. No.: WO2014/191814
PCT Pub. Date: Dec. 4, 2014

(65) Prior Publication Data
US 2016/0104297 A1    Apr. 14, 2016

(30) Foreign Application Priority Data
May 29, 2013    (BR) .......................... 102013013365 5

(51) Int. Cl.
| | | |
|---|---|---|
| G06K 9/00 | (2006.01) | |
| G06T 7/20 | (2017.01) | |
| G06K 9/32 | (2006.01) | |

(52) U.S. Cl.
CPC ............ *G06T 7/20* (2013.01); *G06K 9/00771* (2013.01); *G06K 9/3241* (2013.01);
(Continued)

(58) Field of Classification Search
CPC ....................................................... G06T 7/20
See application file for complete search history.

(56) References Cited

U.S. PATENT DOCUMENTS

| | | | | |
|---|---|---|---|---|
| 6,448,549 B1 * | 9/2002 | Safaee-Rad | ........ | G01N 21/9054 |
| | | | | 250/223 B |
| 9,094,588 B2 * | 7/2015 | Silver | .................. | G06K 9/6253 |

(Continued)

FOREIGN PATENT DOCUMENTS

| | | |
|---|---|---|
| DE | 102012205000 | 12/2012 |
| GB | 2476869 | 7/2011 |

(Continued)

OTHER PUBLICATIONS

Jianbo Shi et al, "Good features to track", IEEE Computer Society Conference on Computer Vision and Pattern Recognition. Proceedings, IEEE Computer Society, US, (Jun. 21, 1994), doi:10.1109/CVPR.1994.323794, ISSN 1063-6919, pp. 593-600, XP010099247 [Y] 1-9 * abstract * * p. 595, paragraph 4*.

(Continued)

*Primary Examiner* — Oneal R Mistry
(74) *Attorney, Agent, or Firm* — Muncy, Geissler, Olds & Lowe, P.C.

(57) ABSTRACT

A method for counting objects such as cans, bottles, and packaging in image data in frames, a frame of said image data in frames, including an image of at least one object, the (Continued)

method comprising the steps of identification of a most pronounced characteristic for each object in a frame of said image data in frames, tracking of a position of the characteristic in the image data in frames by identifying the characteristic in at least one additional frame, and modification of a count by determining the position is outside a border.

16 Claims, 5 Drawing Sheets

(52) U.S. Cl.
CPC . *G06K 9/00785* (2013.01); *G06K 2009/3291* (2013.01); *G06T 2207/30242* (2013.01)

(56) References Cited

U.S. PATENT DOCUMENTS

| | | | |
|---|---|---|---|
| 2003/0053661 A1 | 3/2003 | Magarey | |
| 2006/0146377 A1* | 7/2006 | Marshall | G06T 3/4038 358/486 |
| 2006/0227862 A1* | 10/2006 | Campbell | G06K 9/00778 375/240 |
| 2009/0245616 A1* | 10/2009 | De La Ballina | A21C 9/08 382/141 |
| 2010/0021009 A1* | 1/2010 | Yao | G06K 9/00785 382/103 |
| 2011/0093109 A1* | 4/2011 | Scheid Budzinski | G06Q 10/06 700/109 |
| 2011/0248083 A1* | 10/2011 | Bonner | G06F 16/00 235/375 |
| 2012/0128212 A1 | 5/2012 | Almbladh | |
| 2012/0249790 A1* | 10/2012 | Golan | G06K 9/3241 348/143 |
| 2013/0034268 A1* | 2/2013 | Perron | G01V 5/0016 382/103 |
| 2014/0010456 A1* | 1/2014 | Merler | G06K 9/64 382/191 |

FOREIGN PATENT DOCUMENTS

| | | |
|---|---|---|
| WO | 2000046743 | 8/2000 |
| WO | 2001033204 | 5/2001 |

OTHER PUBLICATIONS

European Search Report from European Patent Office in counterpart European Application No. EP14804275 dated Dec. 9, 2016.

* cited by examiner

METHOD AND DEVICE FOR COUNTING OBJECTS IN IMAGE DATA IN FRAMES, A FRAME OF SAID IMAGE DATA IN FRAMES INCLUDING AT LEAST ONE OBJECT, SUCH AS CANS, BOTTLES, AND PACKAGING, COMPUTER PROGRAM AND COMPUTER PROGRAM PRODUCT

TECHNICAL FIELD

The present invention relates to the counting of objects, such as (but not limited to) cans, bottles and packaging, in image data in frames. Specifically, the present invention involves corresponding methods, devices for counting objects, computer programs and computer program products. Embodiments of the present invention employ image processing of digital image data of images taken of one or more objects for counting the objects as they pass by a given location.

Fundamentals

Modern manufacturing techniques of the beverage production process are generally based on one or more packaging or production lines, along which the products are moved by means of conveyor belts. The stages of packaging or production/manufacturing in turn generally require some type of positional information on the product or item undergoing the particular action. Starting from conventional techniques, there are countless known devices and methods for determining a position of a product on the line, the presence or absence of a product, and for counting the number of objects passing by a given point along the line, etc. Common stages of production include working on the product for application or modification of components of the product, and common packaging stages include packing a product, applying product labels or applying identification marks, such as clear text identifiers or single and two-dimensional barcodes.

The majority of modern packaging or production lines are optimized for high performance speed and efficiency of product. For the first, needless to say, the line speed, that is, the speed at which the products move along the line or with the conveyor belt, and the product density, that is, the spatial and temporal distance between the appearance of two consecutive products at a given position, are certainly important issues in the field of manufacturing and packaging. Therefore, it must be considered that the products pass quickly through the stages of production/packaging, that the product density is high, and more than one product passes at the same time.

One illustrative example of the process of monitoring beverage production includes a bottle filling line which loads the bottles for the stages of filling, sealing and labelling at a high speed. The individual bottles are transported densely, such that there is virtually no distance between them. Examples of an even higher product density, i.e. more than one product passing at the same time, include the transport of raw or packed products that can pile up, be pushed against each other, or overlap.

Figure 1A:
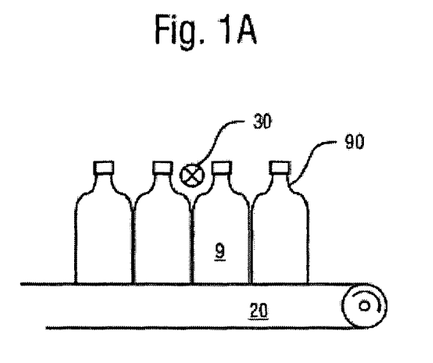
FIGS. 1A to 1C depict conventional counting techniques using laser or light beams and based on properties of the particular objects (such as cans, bottles and packaging)
Figure 1B:
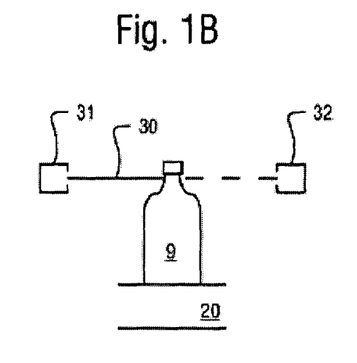

In the case of particular product formats, such as the above bottles with a customary neck, conventional techniques exist for counting objects as they pass. In FIGS. 1A and 1B, the bottles 9 are moving along a conveyor belt 20. A laser beam 30 is positioned at the height of a neck 90 of the bottles 9. Each time a bottle 9 passes, the laser 30 from a source 31 is interrupted (FIG. 1B), such that this event can be detected by a sensor 32. However, this system has the disadvantage that when the objects are arranged very close together, or when they do not have an adequate format, there will not be an interruption of the laser representing a reliable counting of the objects.

Figure 1C:
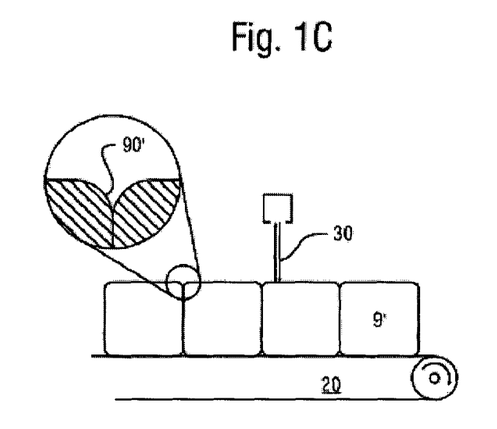

One known technique used to check the production of beverages which seeks to revolve such problems is edge detection, as shown schematically in FIG. 1C. According to this technique, the system reads a feedback signal from the laser 30 and seeks to detect edges 90' between two adjacent products/packages 9'. A counter is modified (usually the count increases) each time the edge 90' is detected. However, in many circumstances this technique cannot be applied, for example, when objects do not have distinguishable edges or when the items or packages are transparent.

Also known is image-based grouping of individual products passing through a laser triangulation visiometric system in lots for counting. Here, images acquired by camera are considered, showing the products and a laser pattern, in order to obtain information on the location of a product. The information obtained is then used to distinguish between the presence of 1 (one) product, the presence of contamination material, or the presence of various products partly or completely overlapping. However, a laser is required to project a well-defined pattern on the scene. Lasers suffer from various disadvantages, however: they can present a danger to nearby workers, especially to the human eye. Furthermore, laser radiation can have disadvantageous effects on the products or might be incompatible with them, such as when the products are transparent, meaning that the pattern is not formed properly.

Although the conventional techniques consider image processing without the use of a laser-induced pattern, these techniques are principally aimed at obtaining a three-dimensional reconstruction of each object, in order to provide information on a position of an object or even decoded information from product label and markings. Taking into account their considerable requirements in regard to processing and computing resources, it is clear that these techniques are not adequate for counting objects at high speed. Such restrictions would result in the need to reduce the achievable speed of the conveyor belt or the number of items allowed per unit of time, but this would be unacceptable in the majority of cases.

Therefore, there is a need for an image-based method of counting objects, such as cans, bottles and packaging, which does not require a particular format of the object or specific surface properties of same, and which is also suitable for high-speed counting of objects, inasmuch as it is sufficiently fast not to interfere with the manufacturing and packaging lines. Furthermore, the method should work with objects which are arranged very close and which, may even be piled up or moving outside of a target position. Specifically, improvements should be made in an image-based method for counting objects used for monitoring the high-speed beverage production process.

SUMMARY

The aforementioned problems are solved by the subject matter of the independent claims of the present invention. Preferred embodiments are described in the dependent claims.

According to one embodiment of the present invention, a method is provided for counting objects in image data in frames, a frame of said image data in frames including an image of at least one object, the method including the steps of identification of a most pronounced characteristic for each object in a frame of said image data in frames, tracking of a position of the characteristic in the image data in frames by identifying the characteristic in at least one additional frame, and modification of a count by determining the position is outside a border. The method is especially applied to the process for monitoring beverage production.

According to another embodiment of the present invention, a device is provided for counting objects in image data in frames, a frame of said image data in frames including an image of at least one object, the device including processing resources configured to identify a most pronounced characteristic for each object in a frame of said image data in frames, track of a position of the characteristic in the image data in frames by identifying the characteristic in at least one additional frame, and to modify a count by determining the position is outside a border. The device is especially applied to the process for monitoring beverage production.

According to additional embodiments of the present invention, there are provided a computer program which includes code that, when executed in a processing resource, implements an embodiment of the method of the present invention, and a corresponding computer program product. The computer program is especially applied to the process for monitoring beverage production.

BRIEF DESCRIPTION OF THE FIGURES

The embodiments of the present invention, which are presented for better comprehension of the concepts of the invention, but are not intended to limit the invention, shall now be described with reference to the figures, in which.

DETAILED DESCRIPTION

Figure 2:
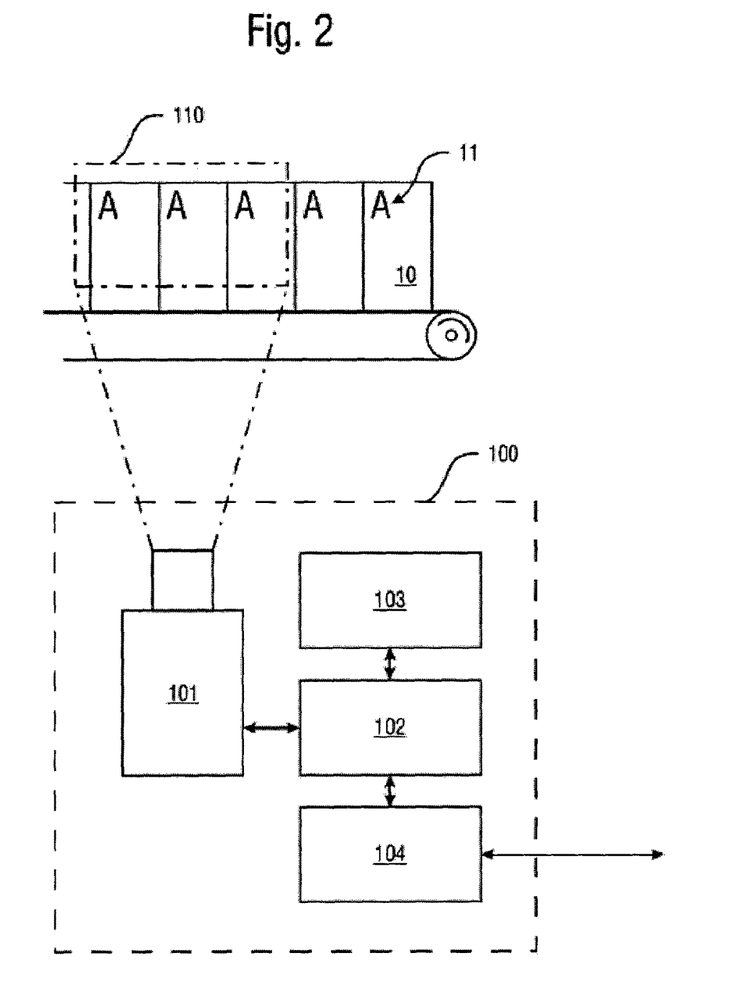
FIG. 2 shows a schematic representation of a system for counting objects (such as cans, bottles and packaging) according to one embodiment of the present invention.

FIG. 2 shows a schematic representation of a system for counting objects such as cans, bottles and packaging according to one embodiment of the present invention. This system considers a set of objects 10 being transported by a belt 20 as being a usual part of, for example, a manufacturing or packaging line. According to embodiments of the present invention, the objects 10 can be transported in a dense manner such that one is adjacent to another. Each object 10 contains a characteristic 11 which can be, for example, a part of the product itself or a design characteristic of a product package. In general, the characteristic 11 should produce certain distinguishable pixel groups in the image data that is acquired from the objects 10. It should be understood that, in the context of the present disclosure, the terms object, items and product denote the same entity, namely, the object which is being counted, that is, the point of interest is determining how many objects have passed by a given point.

In general, the objects can themselves be moving (as in the case of a conveyor belt), or the display field is moving, in the sense that means for acquiring said image data in frames are "scanned" along the objects. An example of this latter case is that the system 100 (or device 100' as described below in conjunction with FIG. 6) is operated so as to scan an arrangement of objects. The availability of this option is an additional advantageous characteristic of the embodiments of the present invention.

A system for counting 100 in line with the present embodiment comprises means for image acquisition, such as a camera 101. The camera 101 is directed at a scene comprising at least one object 10 which is to be counted. For this purpose, a display field 110 of the camera 101 can be directed at a group of objects 10 on the conveyor belt 20. The system 100 likewise comprises processing resources 102, such as a processing unit (CPU), memory resources 103, such as a memory and/or data storage, and communication resources 104, such as a communication/interface unit, so that it can communicate and exchange information with other entities or a network.

In general, the processing resources 102 are configured, for example, via the execution of corresponding code, stored in the memory resources 103, to acquire a frame of image data from the camera 101. Said frame 111 of the image data includes an image of the object 10. The processing resources 102 are also configured to identify a characteristic 11 of the object 10 in the frame, and to track a position of the characteristic 11 in the image data by identifying the characteristic 11 in an additional frame.

In general, "image data in frames" should be understood as being data containing information in at least one image, such an image can then be identified as a frame. Thus, an image is delimited by the borders of the frame, such that the image data in frames contains pixel values for at least one two-dimensional set of pixels of a frame. This set is then within a border of the frame. Thus, the image data in frames can show a picture or image of one or more objects. Preferably, a frame has sufficient information to identify the item.

The image data in frames can also contain a set of images of a single picture in the form of a plurality of frames. A video stream can be one example, in which a data stream transports one frame after another at a certain constant frame rate, or even a variable rate, that is, a figure which determines how many frames are transported in a given unit of time. When the image data in frames refers to a plurality of images in frames, the plurality of images in frames is acquired at different times, meaning that it is possible to extract from the image data in frames information about the evolution over time of the object or the set of objects delimited and depicted in the frame. Thus, the image data in frames might be understood as a sequence of images. Moreover, an image of an object does not necessarily mean that one or more whole objects are depicted, meaning that an image can also show only part of one or more objects. Preferably, the characteristic is within this part.

Each image in frames and thus the image data in frames can, for example, be obtained by means of a camera, a video camera, a device equipped with a CCD or a film or other image detectors. The image can be provided via a light-collecting device, without being limited to visible light, but including for example infrared light, ultraviolet light, or others.

The processing resources 102 are then configured to modify a count by a determination that the position is outside a border, that is, the count is modified when the characteristic being tracked can no longer be identified in a frame of the image data, since it is outside a frame border or outside some border defined by some position in the frame. This may occur when the corresponding object bearing the characteristic has moved outside the display field in the sense that the characteristic or the object has "disappeared". Other embodiments of the present invention also consider the modification of the count by means of the position passing through a particular position in which this position defines the border. This can be defined by a point or line within the frame or also the point at which the characteristic disappears, that is, it can no longer be identified or its position being tracked in the image data. In this way, a device for counting objects in image data in frames can be implemented. The border can coincide with the frame border, and then the position being outside this border means that the characteristic and/or object have disappeared from the image data in frames.

In general terms, the characteristic 11 is common to each object, in the sense that each object being counted has the characteristic 11. Examples of the characteristic 11 include a label, a logo, a design characteristic of a product package, a part of the object, a part of the package, a colour or specific format of the package or the object, or the like. Preferably, the characteristic 11 is unique in the sense that it appears only once in each object. The characteristic 11 is common to the objects 10 in that it can be identified for each object 10 with some degree of reliability.

Figure 3A:
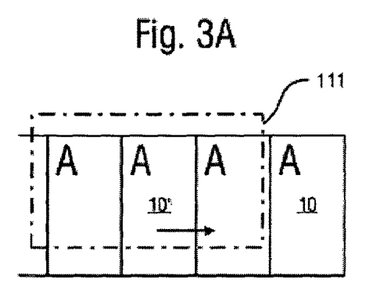
FIGS. 3A and 3B show a schematic representation of different frames obtained from a given display field according to one embodiment of the present invention.
Figure 3B:
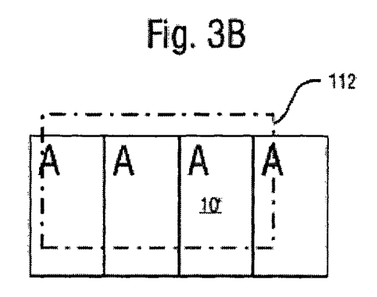

In this way, the embodiments of the present invention allow the counting of objects by means of a non-invasive image-based system 100. Specifically, the camera 101 is able to acquire a sequence of frames (images, pictures) of a portion of the production line or conveyor belt, without affecting the integrity of the objects or imposing any dangers or risks on nearby workers. What is more, the embodiments of the present invention allow the system 100 to be installed at an existing line, with virtually no interference in the surroundings. Specifically, parts of the existing line do not need to be modified or even touched, since the system 100 is completely independent. No sensor or laser source needs to be installed at specific positions of the line. The system 100 can simply be used in one location, from which the camera 101 is able to observe at least one object 10 in its display field 110:

FIGS. 3A and 3B show a schematic display of various frames obtained from a given display field according to one embodiment of the present invention. Specifically, a number of objects 10 is shown as being counted, such as appear for example on the conveyor belt of a production, manufacturing or packaging line. The display field of the camera used maps a frame 111. In this embodiment, the one characteristic 10' has been identified by its appearance in this frame or a previous frame. From this point on, the position of the characteristic 10' is tracked, so that, as shown in FIG. 3B, the specific characteristic 10' can even be identified in a subsequent frame 112. In other words, a characteristic has entered the display field from the left and this characteristic is in the process of gradually leaving the display field at the right.

Figure 4:
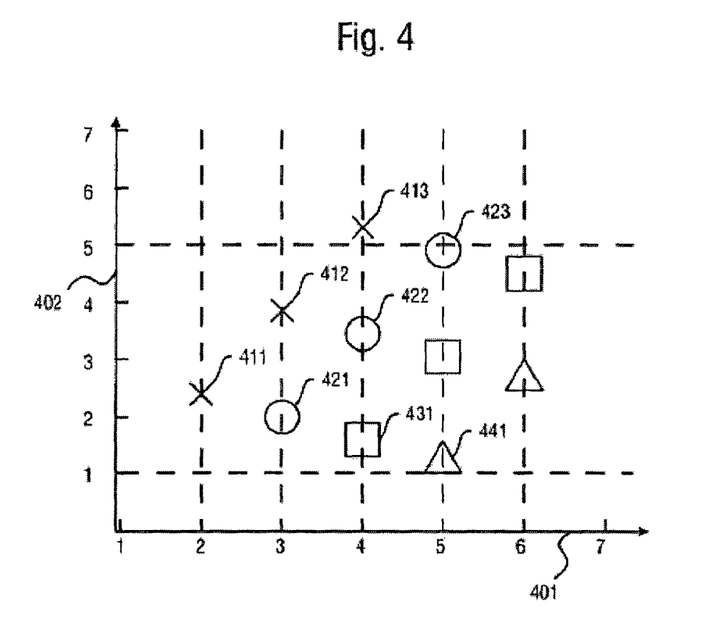
FIG. 4 shows a schematic diagram of the position versus time for a given set of objects (such as cans, bottles and packaging) according to one embodiment of the present invention.

FIG. 4 shows a schematic diagram of position versus time for a given set of objects, such as cans, bottles, and packaging. This is to illustrate the embodiment of the present invention in which each of the image data frames includes an image of a set of objects, and in which the positions of each characteristic of each object in the image data are considered as being tracked by identifying each characteristic in at least one additional frame. Specifically, this embodiment considers some type of position figure, such as a lateral position with reference to the frame, for each object identified. These position figures can be tracked in regard to the individual frames identified by, for example, a frame number 401. The sample figure in the position can generally be defined in arbitrary fashion and is represented here on the axis 402.

With the passing of time, an object first identified is represented by crosses 411 to 413. It initially appears in the frame with a correspondingly low position value at point 411 and moves along the position 402 in subsequent frames to 412 and 413. In similar fashion, an additional object is identified from frame No. 3 onward as the circle 421. In a way that is simultaneous with and independent of the first object, the position of the additional object is also tracked with circles 422 and 423. The same holds when an additional object is identified such as frame No. 4 (see square 431) and even if an additional object has been identified as frame No. 5 (see triangle 441).

Given the above, it is clear that the respective embodiments consider simultaneous tracking of a set of objects. In this way, a high counting reliability can be obtained even at high speeds of the objects as they are moving. This embodiment also allows for a further increase in the counting reliability, for example, by considering and tracking a distance between two subsequent objects, since this distance, within certain given and applicable limits, can map a specific property of the object. For example, said distance can be taken as a constant, in that identical objects are being transported in close succession. The checking of this distance can produce a figure indicating the reliability in regard to the counting or it can even compensate for cases in which a characteristic of an object cannot be identified. In this latter case, the distance can be interpreted as an additional object, inasmuch as it is assumed that the objects always follow each other, or conversely the distance can be interpreted as a missing object.

The counting of product items (objects) can be incorporated in the tracking of various objects. The number of product items corresponds to the number of tracks created or terminated. A track is defined as a set of characteristics (for example, position of the object) extracted over the course of time and associated with the object itself. A track can be created when a product item enters the display field of the camera (frame). When the product item leaves the display field of the camera or a border, its corresponding track is then terminated, and a corresponding count can be modified.

In general, the process of identifying a characteristic characterizing/identifying an object can be based on an algorithm for the extraction of a characteristic point. There are many such algorithms, such as the Harris detector. A Harris detector can be conveniently applied to the present invention for the extraction of the characteristic point for tracking the objects in the display field of the camera. The use of a Harris detector should not be taken as being a limitation, inasmuch as many other algorithms can also be applied to the present invention. A Harris detector detects the characteristic points corresponding to the edges in the images. Since the algorithm for extraction of the characteristic point can technically precisely identify a plurality of points in an analyzed image frame, the term "characteristic" can therefore be understood as equivalent to "a set of characteristic points". Therefore, a set of characteristic points can constitute a characteristic.

Specifically, a Harris detector can employ the following sample matrix $\underline{I}$:

$$\underline{I} = \begin{pmatrix} I_x^2 & I_x I_y \\ I_y I_x & I_y^2 \end{pmatrix};$$

derived from two-dimensional image data i, where $i_x$ is the derivative of i in the x direction, $i_y$ is the derivative of i in the y direction, and $I_x$ and $I_y$ in $\underline{I}$ are the corresponding smoothed-out versions of $i_x$ and $i_y$ (for example, by applying a Gaussian filter). The matrix $\underline{I}$ captures the structure of the vicinity of an image. A characteristic point can then be characterized by a matrix $\underline{I}$ of class 2 (that is, both of the proper values are large). Instead of computing the proper values of $\underline{I}$, Harris proposes computing the following operator H:

$$H = \det(\underline{I}) - \alpha \times \mathrm{trace}2(\underline{I}),$$

where "det" and "trace" denote the determinant and the trace of a matrix. A sample value of α which can produce good and sensitive results is approximately 0.04.

To discriminate between the characteristic points which are located in the product item or object (such as the logo) and the characteristic points which are part of the background, one can use the grey level or colour values of pixels in the vicinity of each of the characteristic points. A product item or object can be represented by a set of subregions centred on characteristic points. The characteristic points extracted in each frame are compared to these subregions (that is, models) by using cross correlation as such a measurement.

The processing resources track the position of the characteristic within a predefined display field (for example, the frame or a subarea of same) by using a Kalman filter, for example. The processing resources can thus include the stage of extracting the characteristic and managing tracks (that is, creating a track, updating a track and terminating a track). In each frame, the characteristics extracted that belong to the product items (objects) can be selected by the use of such a cross correlation measurement. The characteristics selected can then be associated with their corresponding tracks. The association can be performed, for example, by comparing the position of the predicted positions of the tracks and the positions of the selected characteristics. An updating of a track in the current frame corresponds to the adding of a characteristic to the list of previously extracted characteristics. All the characteristics of a track are associated with the same product item in the real world. If a product item enters the display field, then it cannot be associated with any tracks. A new track is created. If a product item leaves the display field, then the corresponding track is terminated. Thus, a count can be modified (for example, incremented by one) each time a track is terminated or crosses a predetermined position, which can be located in the display field.

As for the establishing of the most pronounced characteristic, the methods and devices disclosed can perform this action automatically in that characteristics of objects are identified and, for example, the most pronounced characteristic which is singular, that is, the one which appears only once for each object, is selected as the most pronounced characteristic for subsequent processing. A most pronounced characteristic can be the one that can be identified with the best reliability based on size of the characteristic and/or contrast (distinguishing of corresponding pixel values, or their means, in the image data as compared to pixel values corresponding to the remaining parts of a frame excluding the characteristic). A factory worker can also determine, define and establish the most pronounced characteristic in advance or during the work operation.

Figure 5:
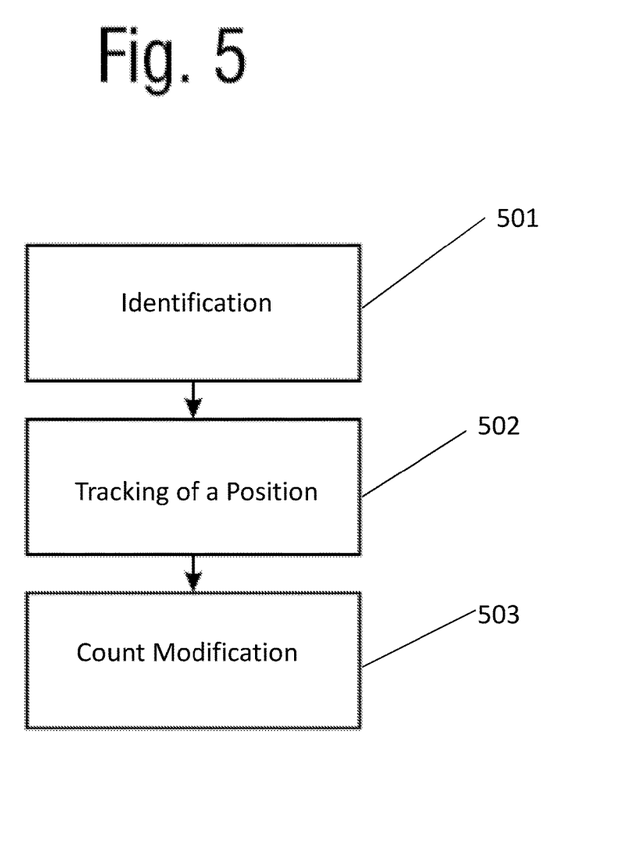
FIG. 5 shows a flow chart of one embodiment of the method of the present invention.

FIG. 5 shows a flow chart of one embodiment of the method of the present invention. The embodiments of the method are generally aimed at counting objects in image data in frames, wherein a frame of image data includes an image of at least one object. These embodiments include a step 501 of identification of a most pronounced characteristic for each object in a frame of said image data, a step 502 of tracking of a position of the characteristic in the image data by identifying the characteristic in at least one additional frame, and a step 503 of modification of a count by determining the position is outside a border.

Figure 6:
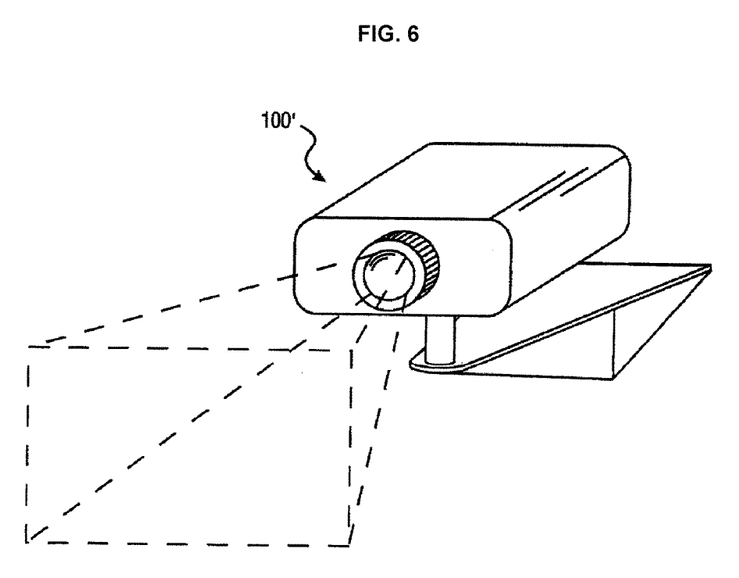
FIG. 6 shows a schematic representation of a device for counting objects (such as cans, bottles and packaging) according to an additional embodiment of the present invention.

FIG. 6 shows a schematic representation of a device for counting objects (such as cans, bottles and packaging) according to an additional embodiment of the present invention. Specifically, an embodiment of the described system 100 is shown as a device for counting an object 100' in the form of a fixed device able to take/acquire an image of a scene including one or more objects being counted. The device 100' can additionally include an integrated processing unit (not shown) to carry out one or more methods from embodiments of the present invention. An additional fixation element can be provided for mounting the device 100', for example, in a production process in which a plurality of objects is passing through the counting device 100'. The device 100' can additionally include means for illuminating of the object(s). The device 100' can obviously take other forms and can be connected by wire or wirelessly. The device 100' can also include means for acquiring said image data in frames which, in turn, can include a camera and some type of camera optics, as shown in FIG. 6.

The present invention is especially applied to the process for monitoring beverage production at high speed.

Although the embodiments have been described, these only serve to provide a better comprehension of the invention defined by the independent claims and should not be seen as limiting.

The invention claimed is:

1. Method for counting objects transported on a conveyor belt as they pass through a scene of a portion of the conveyor belt in image data in frames recorded by a camera directed to said scene, a frame of said image data in frames including an image of at least one object, wherein the method comprises executing on processing resources the steps of:
   extracting a set of characteristic points corresponding to image edges using a Harris detector algorithm matrix,
   extracting a most pronounced characteristic for each object in the frame of said image data in frames, wherein the most pronounced characteristic appears only once for each object in the frame;
   creating a track that stores a set of positions within the frame associated to each object when said object enters into the frame, said set of positions being stored over the course of time;
   tracking a position of the extracted most pronounced characteristic in the image data in frames within a predetermined border using a Kalman filter, wherein position tracking is done by extracting the most pronounced characteristic of said object in at least one additional subsequent frame by extracting characteristic points that belong to the object using a cross correlation measurement, and associating the extracted most pronounced characteristic by comparing the position of the predicted positions of the tracks and the positions of the selected characteristics in said at least one additional subsequent frame to a corresponding track so that the set of positions stored on said track is updated via a list when a position of said extracted most pronounced characteristic in said at least one additional subsequent frame corresponds to a predicted position of the object within said frame and terminating the track when the most pronounced characteristic leaves the predetermined border; and modifying a count of said objects when the processing resources determine from the set of positions stored on the track that the position of the most pronounced characteristic is outside the predetermined border in the at least one subsequent frame.

2. Method according to claim 1, wherein the position of the most pronounced characteristic of an object identified in the frame is determined to be outside said border when said most pronounced characteristic can no longer be identified in the image data in the at least one additional frame.

3. Method according to claim 1, wherein said border is defined by at least one predetermined position in the frame.

4. Method according to claim 1, wherein said border coincides with a border of the frame.

5. Method according claim 1, wherein each of the frames of said image data in frames includes an image of a set of objects, and in that the method includes the tracking of positions of each most pronounced characteristic of each object in the image data in frames by identifying each most pronounced characteristic in at least one additional frame.

6. Method according to claim 5, wherein the method additionally includes the generation of a line of execution of image processing for each most pronounced characteristic by which a position is being tracked.

7. Method according to claim 6, wherein a line of execution is generated by the appearance of the object in the image data in frames.

8. Method according to claim 1, wherein the method additionally includes the determination of the most pronounced characteristic for each object.

9. Method according to claim 8, wherein the determination of the most pronounced characteristic includes the determination of a singularity of the most pronounced characteristic for an object.

10. Method according to claim 1, wherein the identification of the most pronounced characteristic includes the installation of a characteristic identifier.

11. Method according to claim 10, wherein the tracking of the position of the most pronounced characteristic includes associating one characteristic point with said characteristic identifier.

12. Method according to claim 1, wherein it is used in a process for monitoring beverage production.

13. Computer program stored in a non-transitory computer-readable tangible data medium in a non-volatile manner, wherein the computer program includes code, said code when executed in a processing resource implementing the method according to claim 1.

14. Method according to claim 1, wherein the at least one object comprises at least one of cans, bottles, and packaging.

15. Device for counting objects transported on a conveyor belt as they pass through a scene of a portion of the conveyor belt in image data in frames, a frame of said image data in frames including an image of at least one object, the device comprising:

a camera directed to the scene and operable to acquire image data in frames;

memory resources comprising computer program code, and processing resources, wherein the memory resources and the computer program code are configured, with the processing resources, to cause the device to:

receive image data in frames from the camera;

extract a set of characteristic points corresponding to image edges using a Harris detector algorithm matrix, extract a most pronounced characteristic for each object in a frame of said received image data in frames, wherein the pronounced characteristic appears only once for each object in the frame;

create a track that stores a set of positions within the frame associated to each object when said object enters into the frame, said set of positions being stored over the course of time;

track a position of the extracted most pronounced characteristic in the image data in frames within a predetermined border using a Kalman filter, wherein position tracking is done by extracting the most pronounced characteristic of said object in at least one additional subsequent frame by extracting characteristic points that belong to the object using a cross correlation measurement, and associating the extracted most pronounced characteristic by comparing the position of the predicted positions of the tracks and the positions of the selected characteristics in said at least one additional subsequent frame to a corresponding track so that the set of positions stored on said track is updated via a list when a position of said extracted most pronounced characteristic in said at least one additional subsequent frame corresponds to a predicted position of the object within said frame and terminating the track when the most pronounced characteristic leaves the predetermined border; and modify a count of said objects when the processing resources determine from the set of positions stored on the track that the position of the most pronounced characteristic is outside the predetermined border in the at least one subsequent frame.

16. Device according to claim 15, wherein the at least one object comprises at least one of cans, bottles, and packaging.

* * * * *